United States Patent
Pasini et al.

(10) Patent No.: US 12,534,684 B2
(45) Date of Patent: Jan. 27, 2026

(54) PROCESS FOR PRETREATING VEGETABLE OILS OR ANIMAL FATS INTENDED FOR PROCESSES OF TRANSFORMATION INTO BIOFUELS

(71) Applicant: ENI S.P.A., Rome (IT)

(72) Inventors: Thomas Pasini, San Donato Milanese (IT); Franco Baldiraghi, San Donato Milanese (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 18/554,574

(22) PCT Filed: Apr. 6, 2022

(86) PCT No.: PCT/IB2022/053209
§ 371 (c)(1),
(2) Date: Oct. 9, 2023

(87) PCT Pub. No.: WO2022/214993
PCT Pub. Date: Oct. 13, 2022

(65) Prior Publication Data
US 2024/0376398 A1    Nov. 14, 2024

(30) Foreign Application Priority Data
Apr. 9, 2021  (IT) .................. 102021000008957

(51) Int. Cl.
*C11B 3/00* (2006.01)
*C11B 3/04* (2006.01)
*C11B 3/16* (2006.01)

(52) U.S. Cl.
CPC .............. *C11B 3/001* (2013.01); *C11B 3/006* (2013.01); *C11B 3/04* (2013.01); *C11B 3/16* (2013.01)

(58) Field of Classification Search
CPC . C11B 3/001; C11B 3/006; C11B 3/04; C11B 3/16; Y02E 50/10; Y02P 30/20; A23L 5/21

See application file for complete search history.

(56) References Cited

U.S. PATENT DOCUMENTS

| | | | |
|---|---|---|---|
| 1,310,977 A * | 7/1919 | Barton | ....................... C11B 3/06 516/53 |
| 4,072,482 A | 2/1978 | Aoki et al. | |
| (Continued) | | | |

FOREIGN PATENT DOCUMENTS

| | | |
|---|---|---|
| GB | 508099 A | 6/1939 |
| WO | 2012004810 A1 | 1/2012 |

OTHER PUBLICATIONS

International Search Report for International Application No. PCT/IB2022/053209, dated Jun. 22, 2022, 3 pages.

(Continued)

*Primary Examiner* — Cephia D Toomer
(74) *Attorney, Agent, or Firm* — CANTOR COLBURN LLP

(57) ABSTRACT

A method for pretreating and purifying crude bio-feedstocks intended for processes of transformation into biofuels is described, the method being characterized in that the crude bio-feedstock is subjected, in the form of an aqueous emulsion to a heat treatment by passing it through a coil visbreaker furnace at a temperature greater than 100° C. and a pressure greater than 3 barg, possibly in an inert atmosphere, for a pre-established contact/residence time, the effluent exiting the reactor being subsequently subjected to at least a non-absorbent physical separation to separate the bio-feedstock from metal contaminants and phosphorus.

11 Claims, 1 Drawing Sheet

(56) References Cited

U.S. PATENT DOCUMENTS

| | | |
|---|---|---|
| 6,027,755 A | 2/2000 | Henderson et al. |
| 6,759,542 B2 | 7/2004 | Mahlum |
| 7,494,676 B2 | 2/2009 | Chakrabarti et al. |
| 2007/0010682 A1 | 1/2007 | Myllyoja et al. |
| 2020/0040278 A1 | 2/2020 | Malm et al. |

OTHER PUBLICATIONS

Written Opinion for International Application No. PCT/IB2022/053209, dated Jun. 22, 2022, 5 pages.

* cited by examiner

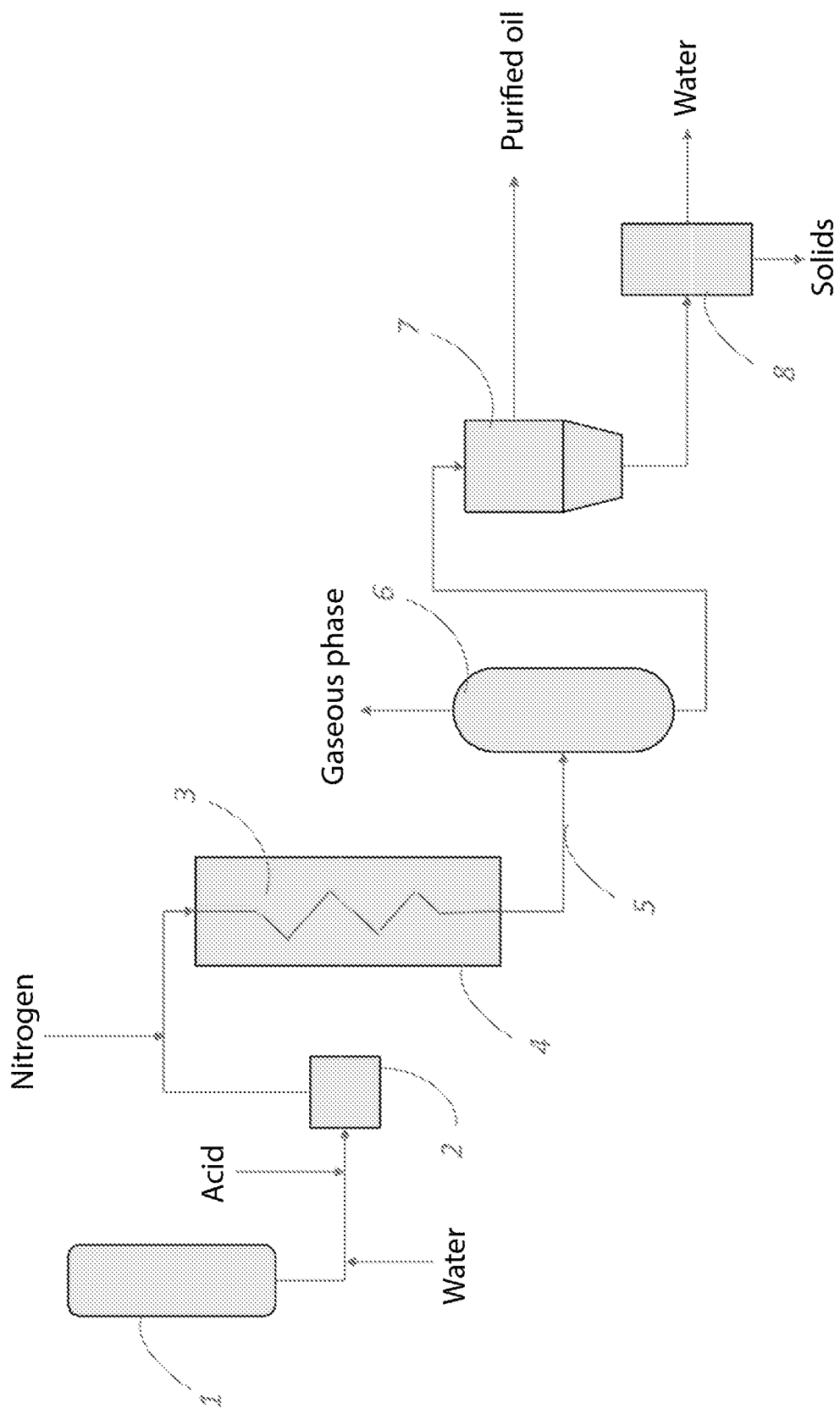

PROCESS FOR PRETREATING VEGETABLE OILS OR ANIMAL FATS INTENDED FOR PROCESSES OF TRANSFORMATION INTO BIOFUELS

CROSS-REFERENCE TO RELATED APPLICATIONS

This application is a 35 U.S.C. § 371 National Stage patent application of PCT/IB2022/053209, filed on 6 Apr. 2022, which claims the benefit of Italian patent application 102021000008957, filed on 9 Apr. 2021, the disclosures of which are incorporated herein by reference in their entirety.

TECHNICAL FIELD

The present disclosure relates to a process for refining crude Bio-feedstocks such as, for example, vegetable oils, animal fats, derivatives thereof including Used Cooking oil (UCO) and/or by-products/Waste obtained from the processing of said bio-feedstocks, for example husk oil, intended for the production of biofuels by means of hydrodeoxygenation and isomerisation technology (e.g. Ecofining™ process to produce biofuels) and/or intended for upgrading processes such as co-feeding in diesel desulphurisation units, hydrocracking, Fluid Catalytic cracking (FCC).

More specifically, the present disclosure relates to a simplified industrial process for pretreating and purifying edible or inedible crude vegetable and/or animal oils, intended for the production of biofuels, where the bio-feedstocks to be treated are subjected, in the form of an aqueous emulsion, to a non-catalytic thermal treatment and subsequent edible or inedible crude physical separation of metal contaminants by filtration and/or centrifugation.

BACKGROUND

There are currently several industrial processes for pretreating and purifying crude vegetable oils intended for the production of biofuels so as to make them suitable for processes of transformation into biofuels.

The pretreatment and purification of the bio-feedstock are necessary to remove the metal pollutants and phosphorus that are present in the oils in the form of phospholipids, in order to preserve the catalytic activity of the catalysts of the upgrading and/or Ecofining™ transformation processes, and to minimise the problems related to the corrosion of the equipment metallurgy and the management of the upgrading plant.

For example, in Ecofining™ processes it is generally required, as a battery limit, that the total content of metal pollutants (e.g. Ca, K, Fe, Mg) and phosphorus in the charge is less than 10 ppm while in a raw bio-feedstock the total content of said pollutants is around 100-200 ppm and the phosphorus content is around 20-30 ppm.

Pre-treatment technologies are different and depend mainly on the type of starting crude bio-feedstock, e.g. vegetable oil.

In general terms, the main technologies for pretreating and purifying vegetable oils to give purified vegetable oils to be subjected to the Ecofining™ and/or upgrading process can be summarised as follows:
Degumming (and neutralization with caustic substances)
Bleaching
Deodorizing.
Catalytic hydrogenation (the purpose of which is only to remove contaminants, including metals, and possibly make a mild hydrogenation of the double bonds).

In order to bring crude vegetable oil according to specification for its upgrading (but this also applies to waste oils and animal fats), the aforesaid processes are generally used in series, as each of the aforesaid technologies is specific for the removal of certain impurities in the oils.

Typically, the DEGUMMING and BLEACHING processes are used in series as they allow the removal of phosphorus and alkali, alkaline earth metals and heavy metals, managing to reach a phosphorus content less than or equal to 3 ppm.

In particular, the DEGUMMING process makes it possible to lower the phosphorus content linked to the presence of phospholipids, and the content of Ca, Mg, which are responsible for the ageing and the deactivation of upgrading catalysts, but not the content of other types of contaminants, e.g. Iron, K. In this type of pretreatment, vegetable oils, waste oils and animal fats are washed under heat (75-100° C.), at atmospheric pressure, with an aqueous acid solution (of different nature, the acid concentration being such that it has a pH of about 5) and subjected to strong mechanical stirring in order to hydrate the non-hydratable phospholipids, and then these oils are neutralized with NaOH to neutralize the excess acid. The gums formed are then separated from the oily phase by various techniques including filtration and ion exchange resins. The product obtained is called degummed oil and the waste products are gums and lecithins. The main acids used are citric acid, oxalic acid, amidosulphonic acid, polycarboxylic acids (ethylenediaminetetraacetic acid EDTA) and phosphoric acid. An example of such a process may be the one described in WO2012/004810. In some cases, enzymatic degumming is performed using enzymes instead of acids to hydrate non-hydratable phospholipids. See for example the process described in U.S. Pat. No. 7,494,676.

The BLEACHING process is a process for the physical removal of impurities (oxidation products), metals not removed by degumming such as alkali metals, e.g. K, transition metals, e.g. Fe, pigments (e.g. carotenoids and chlorophylls), and phosphorus by adsorption on materials called bleaching earths (such as bentonites) or clays, operating at temperatures around 75-100° C. and pressures below 3 barg.

Typically, such adsorption materials are activated by a dilute solution of acid (e.g. citric $C_6H_8O_7$ or phosphoric acid) for the hydration of non-hydratable phospholipids. Typically, the oils that are subjected to bleaching pretreatment are oils with reduced amounts of phosphorus such as, for example, degummed oils, or other impurities. The product obtained is called the bleached product, and the waste products are the spent earths e containing the phospholipids and the adsorbed metals. See for example the process described in U.S. Pat. No. 6,027,755.

The DEODORAZING process is a process that is limited to lowering the amount of free fatty acids (FFA), present or formed, by stripping with superheated vapor, in a vacuum column (<5 mbar), at temperatures of approximately 230-275° C.: it is carried out to prevent a high content of these acids from causing corrosion in the metallurgy of the upgrading plant. See for example the process described in U.S. Pat. No. 4,072,482.

The HYDROTREATING process is a process for saturating the double bonds of vegetable oil that occurs by using nickel-based catalysts: the high content of double bonds would in fact lead to a considerable increase in the reaction exotherm in the subsequent deoxygenation processes with hydrogen. See for example what is described in US2007/0010682.

At present, there are a number of widely used alternative industrial processes in which the above-mentioned pretreatment processes are carried out in the same plant in different combinations with one another, depending on the content and type of pollutants, which can be identified in the following processes:

Palm Oil Treatment (POT).
Biomass Treatment Unit (BTU)
Splitting process—Hydrolysis (for high pollutant charges in the order of a few % by weight).
Continuous Standard Oil&Fat Pretreatment
Continuous High Fatty Acid Feedstock Pretreatment.
Double Pass bleaching.
Pretreatment System for Biodiesel The "Palm Oil Treatment (POT)" process is a technology that involves pretreating and purifying vegetable charges (or a crude bio-feedstock in general) from pollutants such as metals, phospholipids and free fatty acids (FFA), and involves using a Degumming section, a Bleaching section and a Deodorizing section.

The process referred to as "Biomass Treatment Unit (BTU)" allows for the pretreatment and purification of Used Cooking Oil (UCO) and animal fats that have a content of pollutants generally not exceeding 500 ppm, and employs a plant with functions very similar to those of the POT but with some differences in configuration compared to the POT. In fact, there are two degumming sections in parallel instead of one: one dedicated to the acid pretreatment of UCOs and the other for tallow (animal fats). The bleaching section is similar to that of the POT process, but it is supplied with degummed product and a mixture of palm oil and PFAD (Palm Fatty Acid Distillate).

The process for "Splitting" vegetable oils, which is a process of hydrolysis of triglycerides, makes it possible to obtain fatty acids free of impurities in a simple way. The crude bio-feedstock, consisting of oils, fats or a mixture thereof, is introduced, at a temperature of 80-120° C., into a reactive splitter with fillers, together with water at 40-60° C. and high-pressure vapor (70 bar), which also provides the heat for the charge. The hydrolysis reaction of triglycerides takes place at high temperature and high pressure, at 250-260° C. and 60 bar, respectively. The reaction product consisting essentially of stripped fatty acids is taken from the head of the stripping column. The fatty acids obtained are completely free of impurities and constitute a bio-feedstock ready to be subjected to upgrading processes. However, a mixed phase of water, glycerine and contaminants present in the starting crude charge exits from the bottom of the column. The yield of the process in terms of fatty acids is about 72%.

This SPLITTING process almost complete removal of the pollutants (metals and phosphorus are eliminated) that make up the incoming charge but it changes the chemical nature of the product (mixture of free fatty acids) compared to the incoming oil, producing as a co-product about 9% glycerine, which can be valorised and sold in the reference markets. The disadvantage of this process is the high investment costs compared to those of the POT/BTU for the same processed flow rate. Furthermore, as the product obtained is a mixture of free fatty acids (and not oil), this requires plants with highly acid-resistant metallurgy to be further processed.

The pretreatment system called "Continuous Standard Oil&Fat Pretreatment" is suitable for the pretreatment of charges with a high phosphorus content (generally around 0.5% by weight of phosphorus or less) and with a low free fatty acid (FFA) content (less than 5% by weight). Like POT, the process with high phosphorus and low FFA charges provides for two sections: a degumming and neutralization section (with caustic substances) and a bleaching section with silica. Neutralization allows most of the phosphorus and fatty acids to be removed by converting them into gums and soaps and, once neutralized, these residues are removed by adsorption with silica (bleaching).

The "Continuous High Fatty Acid Feedstock Pretreatment" process, which is suitable for the treatment of charges with high FFA content (>5% by weight) and high phosphorus content, provides for a three stages: degumming/neutralization section (which aims at neutralizing the acidity introduced by the acid used for degumming), a bleaching section and a deodorizing section. The removal of fatty acids takes place in the deodorizing section by means of high-temperature vacuum stripping with vapor.

The "DoublePass Bleaching" process essentially consists of a pretreatment with silica of an already degummed/neutralized bio-feedstock which is mixed with silica to absorb the gums, which essentially consist of soaps and phospholipids. In the double pass bleaching system, the processed bio-feedstock, together with silica, is first dried and then filtered through a bed of bleaching earths that has already been used once it is in one of the three filters in order to exploit its residual activity. Thus silica, which contains various impurities including gums and soaps, is deposited on the filter together with the spent earths.

At this point the bio-feedstock, which has already undergone an adsorption operation with silica and a filtration, is subjected to a second bleaching stage. The bio-feedstock is then mixed with the bleaching earths in the bleacher, inside which the impurities are adsorbed. Finally, the bio-feedstock is once again filtered in another filter and the effluent is collected and cooled before passing to intermediate storage.

The "Pretreatment System for Biodiesel" is a process including a series of stages and equipment as follows:

Acid degumming;
Centrifuge operating at high speed for the separation by precipitation of gums;
Bleaching with bleaching earths and/or activated charcoals.

If the bio-feedstocks are particularly rich in contaminants (around 0.5% by weight or less), the process includes a more complex treatment methodology that involves the following four or five steps:

Degumming (not only acid but with water or enzymatic);
Chemical neutralization with soda;
Bleaching with bleaching earths and/or activated charcoals;
Dewaxing for those bio-feedstocks containing waxes;
Deodorizing (through the addition of soda or a stripping column).

As is evident from what has been described so far, the technologies for the pre-treatment of vegetable oils and animal fats that have been developed over the years to remove the impurities mainly represented by phosphorous, Ca, Mg and by alkaline metal (e.g. K) and transition metals (e.g. Fe) are the result of the combination of chemical processes using considerable amounts of chemicals such as acids, bases and absorbent materials of all kinds.

The technical solutions currently available and commercially usable for the pretreatment and purification of vegetable oils also consist of several processes in series in order to reach the phosphorus and metal impurity content required by the subsequent transformation processes, with a consequent process complexity and an increase in the investment and operating costs of these plants.

In addition, the use of considerable quantities of chemicals leads to the production of large quantities of industrial by-products such as spent bleaching earths, which must be managed as waste and disposed of, aggravating the costs for operating the plants and making these plants unsustainable also environmentally.

Patent application US 2020/0040278 discloses a process for purifying bio-feedstocks deriving from vegetable oils or animal fats wherein a step of thermal treatment of the crude/raw feedstock is provided at high temperature in the absence of any water or solvents, in a stirred vessel, and a further step of water washing of the thermally treated feedstock is also provided.

SUMMARY

It is therefore an aim of the present disclosure to provide a simplified industrial process for pretreating and purifying crude bio-feedstocks, e.g. vegetable oils, which is able to overcome the drawbacks the prior art complains of, and which is able to decrease the total content of impurities such as metal pollutants (e.g. Ca, K, Fe, Mg) and phosphorus, in particular to reduce their total content below 10 ppm (by weight), with less complexity in terms of processes and plant.

A further aim of the present disclosure is to provide such a process or method for pretreating and purifying crude (vegetable oils but also animal fats, bio-feedstocks derivatives thereof, including Used Cooking oil and by-products/waste obtained from their processing, for example husk oil) that uses fewer chemicals such as acids, bases and absorbent materials, and in low quantities.

Another aim of the present disclosure is to provide such a method for pretreating and purifying the above-mentioned crude bio-feedstock that shows a substantial decrease of industrial by-products to be disposed of as waste so as to make the process and the plant more environmentally sustainable.

Still another aim of the present disclosure is to provide such a method for pretreating and purifying these crude bio-feedstocks which has greater ease of use and lower operating costs.

A further aim of the present disclosure is to be able to purify bio-feedstocks with high quantities of metal contaminants, i.e. above 100 ppm up to values in the order of a few % by weight, without transforming the oil into a product of a different chemical nature.

In accordance with these aims, the present disclosure relates to a simplified industrial process for pretreating and purifying crude, edible or inedible bio-feedstocks, such as vegetable oils, animal fats, derivatives thereof, including Used Cooking oil and by-products/scraps obtained from their processing and the like, for example husk oil, intended for processes of transformation into biofuels, as defined in the appended claim 1.

Preferred aspects and features of the disclosure are defined in the dependent claims.

The Applicant in fact unexpectedly found that by subjecting a crude/raw vegetable oil (or other crude/raw bio-feedstocks as indicated above) in the form of an aqueous emulsion, to a non-catalytic heat treatment by passing said emulsion into a heated, high-temperature, pressurized coil furnace/reactor (or tubes), it is possible to obtain, in a single stage, an efficient reduction in the content of all contaminants such as heavy and/or transition metals, phosphorus, alkali and alkaline earth metals, resulting in a purified bio-feedstock with a total content of said metal contaminants of less than 10 ppm in total and/or a total phosphorus content of less than 3 ppm, which value is achievable in the prior art by a degumming process followed by a bleaching process.

Therefore, the present disclosure provides a method for pretreating edible or inedible crude bio-feedstocks, such as for example vegetable oils, animal fats, derivatives thereof, including Used Cooking oil and by-products/wastes obtained from their processing and the like, for example husk oil, intended for processes of transformation into biofuels, to remove metal contaminants and phosphorus deriving from phospholipids, said method comprising the following steps Placing said crude bio-feedstock in contact with water to form an aqueous emulsion which constitutes a liquid phase, Subjecting said aqueous emulsion to a heat treatment at high temperature, greater than 100° C., by passing it into a coil, or in at least one tube, heated of a reactor, preferably in a coil, operating at a pressure greater than 3 barg (0.3 MPaG), optionally also in the presence of an inert atmosphere, so as to obtain an effluent at the outlet of said tube or coil;

subjecting said effluent to at least one non-absorbent physical separation to separate said bio-feedstock from said metal contaminants including phosphorus.

The effluent at the outlet of the coil, or of the at least one tube, of the reactor comprises metal contaminants and those including phosphorus in the form of solid residues. In practice, the effluent at the outlet of the coil, or of the at least one tube, of the reactor comprises a liquid-solid phase (water+bio-feedstock+residues deriving from impurities) and possibly also a gas and/or vapor phase.

Therefore, metal contaminants and contaminants including phosphorus, initially present in the raw/crude bio-feedstock, are present in said effluent as solid residues separable from said bio-feedstock by simple non-adsorbent separation, e.g. centrifugation, as will be explained below in detail.

Said coil, or said at least one tube, is advantageously externally heated, homogeneously and uniformly, along its entire length, e.g. by contact of the outer surface of said coil or tube with hot-oil or other heating means, e.g. electric heating, resulting in an isothermal tube or coil.

Said coil or tube has a continuous wall with no holes on it so as to allow heat exchange between the mixture inside the tube/coil and the heating means or the heating fluid that flows externally from said wall and contacts the outside of said wall.

It is understood that the reactor may include not only one tube but also a plurality of heated tubes without departing from the scope of the present disclosure.

For example, in one embodiment of the disclosure it is possible to provide two coils placed in parallel inside the same reactor.

In one embodiment of the disclosure, said coil (tubular reactor developed like a helix) is immerged in a heating fluid, e.g. hot oil having a given temperature, contained in a tank which is under inert atmosphere of nitrogen at low pressure.

Hereinafter, any reference to "tube" is to be understood as extended and also applicable also to "tubes" without departing from the scope of the present disclosure.

In the present disclosure, the term "raw/crude bio-feedstock" is intended to identify a bio-feedstock that has not undergone any treatment or pretreatment (crude/raw charge) before to be mixed with water according to the process of the present disclosure, i.e. a feedstock that has not undergone any water washing and any subsequent centrifugation before being submitted to the thermal treatment as above described.

The aforesaid heat treatment is carried out advantageously for a contact/residence time sufficient to obtain at the outlet of the coil (or tube/tubes) an effluent whose oily phase, represented by the bio-feedstock, has a total contaminant content of less than 10 ppm and/or a phosphorus content of less than 3 ppm.

It is to be intended that in the process according to the present disclosure it is also possible to operate for such a contact/residence time as to obtain an effluent—at the outlet of coil—whose oily phase represented by the purified feedstock has a total content of metal contaminants slightly higher than 10 ppm, for example equal to or less than 50 ppm, without thereby departing from the scope of the present disclosure.

"Contact time" herein means the ratio between the volume of the coil or tube, expressed in $m^3$, and the volumetric liquid flow rate of the bio-feedstock (crude oil) or of the water-bio-feedstock emulsion, expressed in $m^3/h$. Therefore, once the volume of the coil has been defined and the sufficient time to achieve the required decrease in the content of metal pollutants and phosphorus in the bio-feedstock has been identified, the flow rate of bio-feedstock or emulsion supplied to the coil (or tube(s)) can be calculated.

The aforesaid heat treatment-which entails the removal of metal contaminants and phosphorous (deriving from phospholipids) from the bio-feedstock-takes place thus in a single stage, preferably in continuous mode, with short contact times, without the use of vapor supplies in direct contact with the raw/crude feedstock, and at moderate pressure, generally less than 60 barg, as will be described in detail below.

Without wishing to be bound by any theory, the pretreatment and purification process according to the present disclosure appears to be based on the thermal effect due to a homogeneous external heating of the emulsion and the possible presence of vapor (water partially transformed into vapor) inside the coil or tube(s), in equilibrium with the aqueous phase from which it was generated under the operating conditions as defined hereinbelow.

In the present treatment process, hydrolysis of the triglycerides (i.e. formation of free fatty acids) was observed to be in negligible amount, thus not changing the chemical nature of the treated bio-feedstock compared to the one to be purified.

The process in accordance with the present disclosure therefore makes it possible to effectively and simply remove, in a single stage, all metal pollutants such as alkali, alkaline earth metals and heavy metals, (e.g. Ca, K, Fe, Mg) including phosphorus derived from phospholipids present in the starting oil (or other bio-feedstock) without using bases and/or absorbent materials, succeeding in reaching a phosphorus content of less than 3 ppm, preferably even less than 1 ppm, and an overall content of impurities in terms of metal pollutants such as for example Ca, K, Fe, Mg, P, Na, Al, Sn, Zn, less than or equal to 10 ppm (by weight).

The pretreatment and purification process in accordance with the disclosure is suitable to be applied to any bio-feedstock that can be used to obtain biofuels, such as vegetable oils, animal fats, but also to derivatives thereof including, for example Used Cooking oil and by-products/wastes, obtained from their processing, which also contain mixtures of free fatty acids.

Examples of vegetable oils or fats can be sunflower oils, rape oil, canola oil, palm oil, soybean oil, hemp oil, olive oil, linseed oil, peanut oil, castor oil, charlock oil, coconut oil or fatty oils contained in pine wood ("tall oil") or mixtures thereof.

Examples of animal oils or fats are lard, tallow, milk fats and mixtures thereof.

Recycled oils and fats from the food industry can also be used, of both an animal and vegetable origin. The vegetable oils and fats can also derive from selected plants, by genetic engineering.

It is also possible to apply the present process to lipidic charges (bio-feedstocks) constituted by husk oil (or the like) which has a total content of metal contaminants generally about 3400 ppm, much higher than that contained in an animal fat (that is about 400 ppm) and in vegetable oils.

In the present disclosure, with the term "husk oil" it is intended to identify a product obtained by solvent extraction from the scrap residues of palm oil processing.

Particularly advantageous is the application of the process according to the present disclosure to tobacco oil and palm oil, used cooking oil (UCO), crude soybean oil, CAT 1, 2 and 3 animal fats, acid oils, husk oil, Crude Palm Oil Mill Effluent and any by-products thereof.

BRIEF DESCRIPTION OF THE DRAWING

The disclosure is further described below, with reference also to the appended FIGURES in which:

FIG. 1 schematically shows the process units (block diagram) of the method according to the disclosure.

DETAILED DESCRIPTION OF THE DISCLOSURE

Hereinafter, any reference to "oil" is to be understood as referring to and also applicable to any bio-feedstock such as those indicated above, also to a feedstock having a consistency (at ambient temperature) higher than that of an oil, without thereby departing from the scope of the present disclosure.

Furthermore, any reference to "coil" is to be understood as also referring and applicable to "tube" and "tubes", without thereby departing from the scope of the present disclosure.

Referring to FIG. 1, the raw bio-feedstock to be pretreated, e.g. crude vegetable oil, is contained in a heated tank 1, for example by means of an inner coil (without holes) in which steam internally flows so as to heat the bio-feedstock contained inside the tank 1, and preferably kept under stirring.

The temperature of the oil (or bio-feedstock more generally) in the heated tank 1 can generally be comprised between 3° and 90° C., preferably between 4° and 80° C., more preferably between 4° and 50° C.

Said raw heated bio-feedstock is sent by means of a pump (not shown in the FIGURE) to a mixer 2, optionally submitting the charge to a further previous heating for example around 165° C.

In said mixer 2, the bio-feedstock is placed in an intimate contact with water, preferably hot water, more preferably demineralized hot water, e.g. having a temperature comprised between 80 and 100° C., or even higher temperature, for example about 157° C., coming from a dedicated tank.

In the mixer 2, mixing takes place, preferably under heat, between the bio-feedstock and the water so as to form an emulsion of water in oil.

The amount of water to be used to form the emulsion is generally at least 5% by weight with respect to the weight of the crude bio-feedstock to be treated.

In one embodiment this amount of water is comprised between 5-50% by weight, preferably between 5-35% by weight, more preferably between 8-20% by weight with respect to the weight of the crude bio-feedstock to be treated.

In the process of the present disclosure, it is also possible to use amounts of water higher than 50% by weight with respect to the weight of the raw bio-feedstock to be treated without thereby departing from the scope of the present disclosure.

The water to be used in the water-oil emulsion may optionally be acidic in that it may have been pre-mixed with acid substances such as citric acid or other acids such as those used in the degumming process such as oxalic acid, or amidosulphonic acid, polycarboxylic acids ethylenediaminetetraacetic acid, phosphoric acid, in such amounts as to have an acid concentration comprised between 0.5-7%, preferably between 1-5% by weight with respect to the weight of the water.

Said mixing of water with acid can be advantageously effected in-line, even though this procedure cannot be considered as limiting the scope of the present disclosure.

The advantage of using acidic water is to promote the removal of phospholipids, reducing the amount of water to be used in the water-oil emulsion. In addition, the use of acidic water allows to obtain substantially the same removal result but at lower temperatures than using water alone, with the same amount and type of bio-feedstock to be treated.

For example, starting with POME as a crude oil, the use of acidic water enables the reaction to be carried out at 250° C., whereas without the use of acid the treatment reaction would take place at T>320° C.

In addition, the use of acid can be advantageous if the content of metal pollutants such as Ca and Mg is far greater than the content of phospholipids (in terms of phosphorus), for example when the molar ratio (Mg+Ca)/P in the oil to be treated is greater than 2-2.5 because a high Mg+Ca content tends to stabilise the phospholipids.

In one embodiment, the acid may be supplied separately into the line supplying the water to the mixer 2.

In another embodiment, the acid is pre-mixed with water in the water tank and then the resulting acidic water is sent to the mixer 2.

In the mixer 2, the bio-feedstock and the water, possibly containing acid, are subjected to mixing, for example by continuous stirring, so that the formation of a homogeneous emulsion is promoted.

The mixer 2 may be a static mixer or a mechanical mixer with stirrer.

The purpose of stirring is to promote the homogeneous mixing of the amount of water in the bio-feedstock to be treated, so it can be both soft and strong without departing from the scope of the present disclosure.

In another embodiment, the mixer 2 is a static mixer.

The water/oil emulsion formed in the mixer 2 is then supplied to a coil 3 contained within a heater/reactor 4 (e.g., a visbreaking coil-type furnace or reactor with one or more externally heated tube(s), preferably a visbreaking coil-type furnace) optionally operating in an inert atmosphere (e.g., in gaseous nitrogen or other inert gas such as for example Ar, He) to prevent phenomena of thermal decomposition and/or polymerization of the triglyceride structures of the oils being supplied.

The heat treatment reaction can therefore be carried out according to two schemes:

case 1): in the presence of an inert gas and any vapor generated under operating conditions by some of the water in the emulsion;

case 2): in the presence of any vapor generated under operating conditions by some of the water in the emulsion (absence of inert gas).

Case 1) in an inert atmosphere (by supplying nitrogen or another inert gas such as Ar, He, together with the water/bio-feedstock emulsion):

the inerting gas, preferably nitrogen, may be continuously supplied into the mixer 2 at the time of oil/water mixing or into the emulsion supply line at the inlet to the coil 3, or at both points, without departing from the scope of the present disclosure.

In one embodiment, the inerting gas (e.g. inert gas) is supplied into the line supplying the emulsion to the coil 3 of the reactor 4 so as to increase the pressure of the emulsion at the inlet to the coil 3 up to the predetermined working pressure. The stream of inert gas, preferably nitrogen, can vary from 245-1600 Nl/l of oil (bio-feedstock) to be treated.

Case 2) in the presence of only vapor: in this case, only the water/oil emulsion is supplied to the coil 3.

Both in case 1 and 2, the coil 3 of the reactor 4 operates under pressure, generally less than 60 barg, and preferably at a pressure under which the oil/water system is substantially monophasic in terms of physical state (substantially liquid).

In one embodiment the pressure in the coil is comprised between 5 and 50 barg, preferably between 8 and 45 barg, more preferably between 8 and 20 barg, even more preferably comprised between 8 and 15 barg.

In another embodiment, the pressure in the coil is comprised between 5 and 50 barg, preferably between 10-50 barg, more preferably between 20-50 barg, even more preferably between 40-50 barg.

In one embodiment of the present disclosure, the thermal treatment is effected at a pressure in the coil higher than 11 barg (1.1 MPaG).

In another embodiment, the pressure in the coil ranges from 11 to 55 barg, preferably from 13 to 50 barg.

The temperature of the heat treatment is higher than the temperature of the previous mixing of water and crude bio-feedstock. The temperature of the thermal treatment is generally comprised between 100-450° C., preferably comprised between 180-200° C. and 400° C., more preferably comprised between 200° C. and 300° C., even more preferably between 230° C. and 250° C.

In one embodiment of the disclosure, the temperature of the thermal treatment is higher than 180° C., preferably higher than 210° C.

In one embodiment the contact time can vary between 1 and 30 minutes, preferably between 1 and 15 minutes, for example between 10 and 15 minutes.

In another embodiment, the contact time can vary from 1 to 5 minutes.

In another embodiment, the temperature of the heat treatment is comprised between 200-210° C. and 300° C. and the pressure in the coil is comprised between 8 and 15 barg or comprised between 40 and 50 barg.

In another embodiment, the temperature of the heat treatment is comprised between 200-210° C. and 300° C., the pressure in the coil is comprised between 40 and 50 barg, and the contact time is 1-15 minutes, preferably 10-15 minutes.

In one embodiment of the disclosure, the temperature of the thermal treatment is between 220-230° C. and 300° C., the pressure in the coil ranges from 35 barg to 55 barg, and the contact time is 1-15 minutes, preferably 10-15 minutes.

In the event that the oily phase of the effluent, i.e. the bio-feedstock which is no more crude/raw, does not meet the requirements in terms of contaminant content, it is possible to supply again the effluent to the head of the coil 3 for a second passage within the heated coil 3.

The effluent 5 exiting the coil 3 of the reactor 4, optionally added with a disemulsifying additive (e.g. dmo86596 marketed by the Baker Hughes company) and/or antifoaming additive conventionally used in the art, is then sent to a non-adsorbent physical separation system.

In one embodiment, the non-adsorbent physical separation system comprises a high pressure separator 6 so as to separate the effluent 5 into at least two streams represented by a liquid-solid phase (water+oil (lipidic phase)+residues deriving from impurities) and a vapor phase (water vapor) and/or gaseous phase (the latter containing the reaction products such as traces of $C_1$-$C_5$ hydrocarbons, a $CO/CO_2$ mixture, and possibly the inert gas).

In this case, the liquid-solid phase exiting said two-phase separator 6 will be then sent to a physical separation step, e.g. centrifugation in the centrifuge 7, in order to separate the aqueous phase containing the suspended and/or dissolved solid residues (e.g. gums, solubilised pollutants (e.g. contaminating metals)) from the oily phase represented by the purified oil or more generally by the purified bio-feedstock.

In one embodiment of the disclosure, upstream said first centrifuge it can be provided a step of reduction of the pressure of the effluent and a step of the homogenization and cooling of the treated bio-feedstock/effluent to allow the decrease of the temperature thereof since the centrifuges generally operate at pressures and temperatures lower than those in the coil.

The purified oil exiting the centrifuge 7 is therefore already according to specification, without residues, as it contains an overall amount of metal pollutants, including phosphorus, of less than 10 ppm.

Said purified oil exiting the centrifuge 7 may optionally be subjected to an optional filtration in order to eliminate any dispersed solids, if still present, without thereby departing from the scope of the present disclosure.

The aqueous phase which has been separated from the oily phase by the centrifuge 7 contains the solid residues including the metal contaminants, and optionally a small fraction of oil that has been remained emulsified with water: said aqueous phase will then advantageously be subjected to a further separation phase, e.g. centrifugation, to remove from the water the solid part (e.g. gums, solids which may contain the contaminating metals) and any other residues such as the optional fraction of oil, subjecting subsequently said separated water to a treatment step suitable to allow the proper disposal of said aqueous phase.

Said solid portion separated from the aqueous phase contains thus metals such as Fe, Sn, Na, Ca, K and phosphorous, and said solid portion can also be in the form of sludges in case residual water is contained therein, without thereby departing from the scope of the present disclosure.

The high pressure separator 6 may be any two-phase gas-liquid separator known in the art, particularly known in the Oil & Gas industry.

In another alternative embodiment (not illustrated in the FIGURE), the effluent 5 exiting the coil 3 of the reactor 4 is sent to the separation system comprising a three-phase separator 6 so as to obtain three distinct streams represented by an oily phase, an aqueous phase with the aforesaid dispersed residues/solids and a gaseous phase.

Also in this case, the oily phase obtained from the three-phase separator 6 can be sent to another physical separator including at least one filter to remove any solid residues if still present, before being sent to the upgrading stage as a purified bio-feedstock.

The three-phase separator 6 may be any three-phase separator known in the art, for example a three-phase separator used in the Oil & Gas industry.

In another embodiment, the effluent separation system 5 comprises a two-phase separator 6 and a filter or centrifuge 7, preferably a centrifuge 7.

Although in the pretreatment and purification process according to the present disclosure the removal of phospholipids and metal pollutants occurs at higher T and P than in conventional degumming processes, it is an advantage of the process of the present disclosure to be able to purify crude bio-feedstocks from metal contaminants and phospholipids in a single stage, using also equipment already present in conventional fuel refineries, so as to promote revamping of existing oil refining plants and greater versatility thereof.

In particular, by using the process of the present disclosure it is possible to purify raw/crude bio-feedstocks from phospholipids and various metal contaminants in a sole step, without the need to resort to a subsequent use of bleaching earths generally used to remove alkaline metals, e.g. K, transition metals, e.g. Fe, and pigments.

A further advantage of the process of the present disclosure is that it is not necessary to use acids for the removal of impurities when operating at T greater than 250° C.

Furthermore, compared to the splitting process, the process of the present disclosure shows the advantage of operating at lower pressures (compared to 60 bar) and not requiring the use of high-pressure vapor supply lines to succeed in the purification of the raw/crude bio-feedstock, thus saving operating costs.

A further advantage of the present process over the splitting process is that it maintains the nature of the oil as the reaction of transformation of triglycerides into free fatty acids is very contained, thus obtaining an oil with a negligible content of impurities and a content of free fatty acids (FFA) generated by this pretreatment (% of hydrolysis) that is advantageously less than that of the known processes.

In particular, in the present process the content of the FFA generated by the thermal treatment is such as to obtain a content of FFA typically lower than 40% by weight, or even around 40% approx., and it is also possible to achieve a total content of FFA in the treated bio-feedstock lower than 1-2% by weight when the initial value of FFA in the bio-feedstock to be treated is low, which allows the oil purified in accordance with this process to then be used in upgrading plants having a non-noble metallurgy.

The process according to the present disclosure can thus be carried out in a plant comprising the following sections:
  Oil supply (e.g. bio-feedstock) to be pretreated;
  Water supply;
  Oil/water mixing;
  Heat treatment in the reactor/coil furnace with isothermal Coil heated homogeneously along the entire length (for example by heating with a hot oil control unit);
  Separation of the aqueous phase with residues from the oily phase in a physical separator (e.g. biphasic);
  Centrifugation;
  Water/solids separation.

The defects of the prior art are therefore overcome by the method in accordance with the disclosure, which achieves in particular the following advantages:

- substantial reduction in total content of metal pollutants (<10 ppm), particularly of phospholipids (<3 ppm, preferably less than 1 ppm), with a reduced process and plant complexity;
- fewer chemicals used as bases and absorbent materials and in low quantities;
- a substantial absence of industrial by-products to be disposed of as waste, thus making the process and the plant more environmentally sustainable;
- greater ease of use and lower running costs.

The method according to the present disclosure may be carried out in a plant comprising

- a reactor/furnace 4 with a heated coil 3, or having at least one heated tube, preferably a visbreaker coil furnace;
- a non-adsorbent physical separation unit comprising at least a filter and/or centrifuge 7, preferably a centrifuge 7, for the separation of the bio-feedstock from said metal contaminants including phosphorus in the form of solid residues and possibly a gas/liquid separator 6, placed upstream of said filter or centrifuge, to separate a gas and/or vapor phase from the remaining liquid-solid phase, wherein said separation section is arranged downstream of said reactor 4.

Furthermore, upstream of said reactor 4, said plant advantageously also provides

- a storage section of the crude bio-feedstock to be treated comprising a heated tank 1,
- a mixing section arranged downstream of said storage section and upstream of said reactor 4, comprising a mixer 2,
- a water supply section, where said sections are in fluid communication with each other by means of fluid lines such as conduits.

Some illustrative but not limiting examples of the present disclosure follow.

EXAMPLES

Characterization and Method of Analysis

TAN (Total Acid Number)
   It is measured in accordance with ASTM D664 and it is expressed as mgKOH/g Elementary Analysis
   It has been carried out by means of ICP technique, by using ICP Thermo ICAP 6500 DUO instrument, commercialized by Thermo Fisher Scientific.

$^1$H-NMR Compositional Analysis
   It is carried out by using the spectrometer 1H-NMR Varian at 500 MHZ.

Density @ 70° C.
   The measurement is carried out in accordance with the standard ASTM 4052, by using Stabinger SVM 3001 instrument.

Viscosity (cSt) @50° C.
   The measurement is carried out in accordance with the standard ASTM 7566 by using Stabinger SVM 3001 instrument.

FFA from TAN
   It is calculated by using the correlation FFA=TAN/2

% of Oxygen (diff.)
   It is calculated by difference (% 0 diff.) using the following correlation O %=100-% C-% H-% S-% N while considering the % of N and S equal to zero in the calculation since their values are in the order of ppm as they are negligible (O %=100-% C-% H)

Example 1

A tobacco oil having the following characteristics
Density at 70° C.: 0.889 kg/l
Viscosity at 50° C.: 22 cst
Acidity (TAN) 7.7 mgKOH/g
FFA (free fatty acid): 3.25-3.6% by weight (measured by NMR)
FFA (calculated from TAN)=3.85%
and with a metal contaminant content as reported below in Table 1, was subjected to the pretreatment and purification process according to the disclosure under the conditions described below.

TABLE 1

|  |  | TOBACCO OIL |
|---|---|---|
| Al | ppm | 0.6 |
| Ca | ppm | 13.4 |
| Fe | ppm | 1.4 |
| K | ppm | 52.1 |
| Mg | ppm | 12.9 |
| Na | ppm | <0.5 |
| P | ppm | 20.6 |
| Sn | ppm | <0.5 |
| Zn | ppm | 1.4 |
| Total | ppm | 102.4 |
| (Mg + Ca)/P mol |  | 1.31 |

The contaminants in tobacco oil to be removed are mainly Ca, Mg, K, and P as their content has the greatest influence on the overall impurity content.

A stream of oil to be purified (60 ml/h equal to 53.33 g/h), preheated to 80° C. in the supply tank, is sent through a syringe pump to a static mixer where it is mixed with water at room temperature (15 ml/h); this emulsion is then sent to the coil reactor (volume of the coil equal to 15 ml) and before entering the reactor (coil)—heated to a temperature of 300° C. by electric furnace—is placed in contact with nitrogen at room temperature (49 Nl/h).

The pressure in the coil is 10 barg.

The contact time is 15 minutes, calculated on the liquid volumetric flow rate of the oil.

The effluent exiting the coil then enters a high pressure separator where the gaseous phase (consisting of over 95% nitrogen and traces of $C_1$-$C_5$-hydrocarbons, a $CO/CO_2$ mixture and water vapor) and the liquid phase (treated oil and $H_2O$ and solid residues such as gums and metal pollutants) are separated, where the gaseous phase (excluding the nitrogen carrier) accounts for 0.2-1% with respect to the overall mass on the supplied charge.

The liquid phase is collected in a dedicated tank: an oily phase/aqueous phase (oil/water) physical separation is then carried out with centrifugation and which ends with the filtration of the centrifuged oily phase in order to eliminate any dispersed solids.

An aliquot of the filtered oily phase is characterised by elemental analysis (by ICP technique, using the Thermo Fisher Scientific's ICP Thermo ICAP 6500 DUO instrument) to quantify the residual contaminants.

Subsequently, a further aliquot of filtered oily phase is subjected to 1H-NMR composition analysis to assess any chemical changes (e.g. polymerisations, de-oxygenation and hydrolysis with formation of free fatty acids).

The purified Tobacco oil obtained with the process according to the disclosure is according to the Ecofining specification with regard to the total contaminant content (<10 ppm) as shown in Table 2.

TABLE 2

| TEST | | | Bio 146/42/K3 |
|---|---|---|---|
| Temperature | ° C. | | 300 |
| Pressure | bar | | 10 |
| Pressure | ml/h | | 60 |
| Oil flow rate | ml/h | | 15 |
| Conc. Cit. Acid | % in $H_2O$ | | 0 |
| Nitrogen flow rate | nl/h | | 49 |
| | | Charge | |
| Al | PPM | 0.6 | 0.0 |
| Ca | PPM | 13.4 | 0.9 |
| Fe | PPM | 1.4 | 0.0 |
| K | PPM | 52.1 | 0.0 |
| Mg | PPM | 12.9 | 0.0 |
| Na | PPM | 0.0 | 0.0 |
| P | PPM | 20.6 | <1 |
| Sn | PPM | <0.5 | 0.0 |
| Zn | PPM | 1.4 | 0.6 |
| TOT | PPM | 102.3 | 1.5 |
| % REMOVAL | | | 98.5 |

As can be seen from the total phosphorus content of less than 1 ppm compared to the initial 20.6 ppm, it is clear that the process of the disclosure makes it possible to purify tobacco oil from phospholipids in a single reaction step without resorting to the use of bleaching earths (bleaching).

Example 2

The process of example 1 was repeated here but using POME (Palm Oil Mill Effluent) oil as the starting crude oil with the following characteristics
Density at 70° C.: 0.877 kg/l
Viscosity at 50° C.: 29.5 cSt
Acidity (TAN): 4.9 mgKOH/g
FFA (free fatty acids): 2.5% by weight (calculated from TAN)

and whose concentration's of metal contaminants are reported in Table 3, wherein two sets of temperature, pressure (gauge) and stream (different water flow rate) conditions are indicated in Table 4.
Table 3

TABLE 3

| | | POME |
|---|---|---|
| Al | ppm | 8.1 |
| Ca | ppm | 33.4 |
| Fe | ppm | 45.1 |
| K | ppm | 27.9 |
| Mg | ppm | 5.16 |
| Na | ppm | 7.2 |
| P | ppm | 11.03 |
| Sn | ppm | 0.61 |
| Zn | ppm | 0.57 |
| Tota | ppm | 139.07 |
| (Mg + Ca)/P mol | | 2.95 |

The contaminants to be reduced in POME oil are mainly Ca, Mg, K, Fe and P as their content has the greatest influence on the overall impurity content.

Since Pome has a molar ratio (Mg+Ca)/P of more than 2.5, an aqueous solution of citric acid (5% by weight concentration of citric acid in water) was used to remove all pollutants.

The operating conditions under which the contaminant content <10 ppm has been achieved are shown below in Table 4 (metal content expressed in ppm).

TABLE 4

| Temperature ° C. | 250 | 250 |
|---|---|---|
| Pressure bar | 50 | 50 |
| Oil flow rate ml/h | 60 | 60 |
| Flow rate H2O ml/h | 15 | 30 |
| Conc. Cit. Acid in H2O | 5 | 5 |
| Nitrogen flow rate Nl/h | 49 | 49 |
| RUN | 7 | 8 |
| Al | <0.5 | <0.5 |
| Ca | 0.6 | 0.9 |
| Fe | <0.5 | 0.6 |
| K | <0.5 | <0.5 |
| Mg | <0.5 | <0.5 |
| Na | <0.5 | <0.5 |
| P | <1 | <1 |
| Sn | <0.5 | <0.5 |
| Zn | <0.5 | <0.5 |
| Tot. metal | 0.6 | 1.5 | wherein "Conc. Cit. Acid in $H_2O$" indicates the concentration by weight % of citric acid.

The oils purified by this thermal process were finally subjected to catalytic hydrogenation to simulate the first stage of a hydrogenation process such as the Ecofining process (catalytic hydrogenation followed by isomerisation), using a commercial catalyst (BDO200 marketed by UOP LCC) based on NiMo and operating under the following conditions (in batch):
Temperature: 270° C.
Pressure: 35 bar
LHSV (referred to fresh charge): 0.2 h−1
LHSV (referring to fresh charge+recycling): 0.67.

The tests showed that the thermal process to which the crude oils used in examples 1 and 2 were subjected did not alter their and chemical reactivity nature: after hydrogenation, the pretreated oils were deoxygenated and linear paraffin mixtures in the $C_{14}$-$C_{20}$ range were obtained, similar to what happens with the same oils purified with traditional systems (degumming+bleaching).

Example 3 (without Inert Atmosphere)

An Indonesian Crude Palm Oil, having the chemical and physical characteristics reported in Table 5 was subjected to the pretreatment process according to the disclosure under the conditions described below.

TABLE 5

| Temperature | ° C | 200 |
|---|---|---|
| Pressure | bar | 30 |
| Oil flow rate | ml/h | 60 |
| Water flow rate | ml/h | 15 |
| Conc. Citric acid | % | 1% |
| Nitrogen flow rate | Nl/h | — |
| C | % | 76.8 |
| H | % | 12.1 |
| O | % diff | 11.1 |

TABLE 5-continued

| | | |
|---|---|---|
| S | ppm | 7 |
| N | ppm | 10 |
| Density at 70° C. | g/ml | 0.8765 |
| Acidity | mgKOH/g | 12.46 |
| FFA (TAN) | weight % | 6.2 |
| FFA (NMR) | weight % | 5.5 |
| Al | ppm | <0.5 |
| Ca | ppm | 16.3 |
| Fe | ppm | 2.1 |
| K | ppm | 3.2 |
| Mg | ppm | 2.3 |
| Na | ppm | 0.91 |
| P | ppm | 12.3 |
| Sn | ppm | <0.5 |
| Zn | ppm | <0.5 |
| Tot | ppm | 37 |

Again, the contaminants to be removed from the crude palm oil are phosphorus and alkali/alkaline earth metals.

A stream of oil to be purified (60 ml/h equal to 51.6 g/), preheated to 90° C. in the supply tank, is sent through a syringe pump to a mixer where it is mixed with water acidulated with 18 citric acid (15 ml/h—at room temperature).

It then enters the 200° C. heated coil reactor by means of an electric furnace (volume of the coil equal to 15 ml).

The pressure in the coil is 30 barg.

The contact time is 15 minutes, calculated on the liquid volumetric flow rate of the oil.

The effluent exiting the coil then enters a high pressure separator where the very small gaseous phase (consisting of traces of hydrocarbons and co/$CO_2$) is separated: the gaseous phase constitutes approximately 0.1% with respect to the overall mass of the charge (oil) supplied. The liquid phase is collected in a dedicated tank: an oil/water physical separation is carried out by centrifugation and which ends with the filtration of the centrifuged oily phase in order to eliminate any dispersed solids.

An aliquot of the phase is characterised by elemental analysis (by ICP technique, using Thermo Fisher Scientific's ICP Thermo ICAP 6500 DUO instrument) to quantify residual contaminants.

A further aliquot of the oily phase is then subjected to 1H-NMR compositional analysis to assess any chemical changes, e.g. polymerisation, hydrolysis with formation of free fatty acids, de-oxygenation.

Palm oil thus purified is according to Ecofining specification with regard to the total content of metal contaminants (<10 ppm) and the total phosphorus content (less than 1 ppm), as can be seen from the following table 6 below.

TABLE 6

| | | |
|---|---|---|
| Al | ppm | <0.5 |
| Ca | ppm | 1.23 |
| Fe | ppm | <0.5 |
| K | ppm | <0.5 |
| Mg | ppm | <0.5 |
| Na | ppm | 0.6 |
| P | ppm | <1 |
| Sn | ppm | <0.5 |
| Zn | ppm | <0.5 |
| Tot | ppm | 1.83 |

Therefore, even in the absence of an inert atmosphere within the coil, it is possible to remove contaminants up to the desired levels.

Example 4

In this example a sample of an animal fat (CAT 1/2) has been purified by using the process according to the present disclosure. The characteristics of the animal fat are reported in table 7.

TABLE 7

| Raw animal fat | | |
|---|---|---|
| Density @15° C. | g/ml | 0.9168 |
| C | % | 75.2 |
| H | % | 11.6 |
| O | % diff | 13.2 |
| S | ppm | 149 |
| N | ppm | 2190 |
| Basic N | ppm | 250 |
| Cl | ppm | 25 |
| TAN | mgKOH/g | 42.25 |
| FFA (TAN) | % | 21.125 |
| FFA ($^1$H-NMR)* | % | 23.4 |
| P | ppm | 131 |
| Al | ppm | <0.5 |
| Ca | ppm | 10.1 |
| Fe | ppm | 147 |
| K | ppm | 39.2 |
| Mg | ppm | 0.9 |
| Na | ppm | 41.6 |
| Sn | ppm | 16 |
| Zn | ppm | 0.9 |
| Total metals | ppm | 255.7 |
| Total contaminants | ppm | 387 |

*= measurements effected to validate the value of FFA calculated from TAN.

As it is possible to observe from the Table 7, this bio-feedstock is characterized by a high level of contaminants, in particular metals, P, and nitrogen. For this reason, the test was carried out at high pressure (45 bar), without using inert gas. The purification test has been carried out under the operation conditions as here below reported, by following the procedure described in example 1 in the same plant:

Coil Temperature: 250° C.
Coil Pressure: 45 barg
Oil flow rate: 60 ml/h
Oil Contact time: 15 minutes
Acid water flow rate: 10 ml/h
Citric acid in water: 1%
Oil/Water Flow Ratio=6

The raw feedstock has been pre-heated at 90° C. in the feed vessel and then is sent to a mixer by ISCO PUMP in order to mix it with acidic water.

The mixture is then fed to the coil reactor preheated to 250° C.

The effluent from the coil reactor is then transferred to a high-pressure separator where the traces of gas (mainly CO, $CO_2$ and traces of light hydrocarbons) are removed.

The liquid phase (water and purified bio-feedstock) which has been separated from the gas phase is collected in a dedicated thank.

By centrifugation the water phase is separated from the purified oil phase. The quality of the purified animal fat is reported in table 8.

TABLE 8

| Purified animal fat | | |
|---|---|---|
| Density @ 15° C. | g/ml | 0.9172 |
| C | % | 75.3 |

TABLE 8-continued

| Purified animal fat | | |
|---|---|---|
| H | % | 11.9 |
| O | % diff. | 12.8 |
| S | ppm | 161 |
| N | ppm | 1807 |
| Basic N | ppm | 149 |
| Cl | ppm | 2 |
| TAN | mgKOH/g | 107.61 |
| FFA (TAN) | % | 53.805 |
| P | ppm | 1.6 |
| Al | ppm | <0.5 |
| Ca | ppm | 1.6 |
| Fe | ppm | 9.8 |
| K | ppm | 2.9 |
| Mg | ppm | <0.5 |
| Na | ppm | 3.1 |
| Sn | ppm | 2.3 |
| Zn | ppm | <0.5 |
| Total Metals | ppm | 19.6 |
| Total contaminants | ppm | 21.2 |

The reduction of the total amount of metals is greater than 92% and the residual phosphorus content is less than 3 ppm. It is interesting to observe that by using the process according to the present disclosure it is possible to remove also other contaminants:

Chlorine: Cl removal 92%

Nitrogen: Total nitrogen removal approx. 20% and Basic Nitrogen removal approx. 40%. Furthermore, the hydrolysis that has generated further FFA is in a limited extent, and it is around 40-41% approx. when calculated as (FFAout-FFAin)/(100-FFAin)*100. It is intended that the hydrolysis can be evaluated as FFAin/FFAout, FFAout-FFAin or FFAout/FFAin, without thereby departing from the scope of the present disclosure.

Example 5

In this example, a sample of husk oil has been purified by using the process in accordance with the present disclosure. Husk oil is a product obtained by solvent extraction of palm oil processing residues. The Husk Oil used in the present example has the characteristics reported in Table 9.

TABLE 9

| Raw Husk Oil | | |
|---|---|---|
| Density @15° C. | g/ml | 0.9348 |
| C | % | 74.8 |
| H | % | 11.3 |
| O | % diff | 13.9 |
| S | ppm | 171 |
| N | ppm | 1025 |
| Cl | ppm | 188 |
| TAN | mgKOH/g | 14.2 |
| FFA (TAN) | % | 7.1 |
| P | ppm | 1910 |
| Al | ppm | 21 |
| Ca | ppm | 307 |
| Fe | ppm | 118 |
| K | ppm | 602 |
| Mg | ppm | 398 |
| Na | ppm | 7 |
| Sn | ppm | <0.6 |
| Zn | ppm | 8.8 |
| Total metals | ppm | 1461.8 |
| Total contaminants | ppm | 3371.8 |

As it is possible to observe from the Table 9, the amount of contaminants in the raw bio-feedstock is very high (Metals 1461 ppm, phosphorous 1910 ppm and nitrogen 1025 ppm).

The purification test has been carried out under the following operating conditions:

Coil Temperature: 250° C.; Coil Pressure: 45 barg.

Bio-feedstock (oil) flow rate: 410 ml/h

Oil Contact time: 15 min

Acid water flow rate: 600 ml/h; Citric acid in water: 5%.

Oil/water flow ratio: 0.68.

The quality of the purified Husk oil is reported in table 10.

TABLE 10

| Purified Husk Oil | | |
|---|---|---|
| Density @15° C. | g/ml | |
| C | % | 76.4 |
| H | % | 12 |
| O | % diff | 11.6 |
| S | ppm | 37.2 |
| N | ppm | 225 |
| Cl | ppm | 5.9 |
| TAN | mgKOH/g | 35.2 |
| FFA (TAN) | % | 17.6 |
| P | ppm | 2.6 |
| Al | ppm | <0.5 |
| Ca | ppm | 0.5 |
| Fe | ppm | <0.5 |
| K | ppm | <0.5 |
| Mg | ppm | <0.5 |
| Na | ppm | 1 |
| Sn | ppm | <0.5 |
| Zn | ppm | 1 |
| Total Metals | ppm | 2.5 |
| Total contaminants | ppm | 5.1 |

The reduction of the metal content is greater than 99%. The phospholipids are almost quantitative removed (residual P level <3 ppm).

The Chlorine (Cl) removal is greater than 95%.

It is interesting to observe that also the N removal (>75%) is very high if compared to that of the animal fat in the example 4 (about 20%).

This is due to the fact that most of the nitrogen in the Husk oil is in the phospholipid molecules.

Furthermore, the hydrolysis that has generated further FFA is in a limited extent, and it is about 14% when evaluated as (FFAout−FFAin)/(100−FFAin)*100.

Moreover the FFA are increased of 2.5 times only (FFAout/FFAin).

The invention claimed is:

1. A method for pretreating edible or inedible crude/raw bio-feedstocks, intended for processes of transformation into biofuels, to remove metal contaminants and phosphorus in the form of phospholipids, the method including the following steps:

placing said crude bio-feedstock in contact with acidic water to form, by mixing, an aqueous emulsion which constitutes a liquid phase, subjecting said aqueous emulsion to a heat treatment at a temperature greater than the temperature of the previous mixing with water and comprised between 200° C. and 400° C., by passing it into a coil, or in at least one tube, externally heated of a reactor, operating at a pressure comprised between 13-50 barg (1.3MPag-5MPag), optionally also in the presence of an inert atmosphere, so as to obtain an effluent at the outlet of said tube or coil, and subjecting said effluent to at least one non-absorbent physical separation to separate said bio-feedstock from said metal contaminants and phosphorus.

2. The method according to claim 1, wherein the crude bio-feedstock is selected from vegetable oils, animal fats, derivatives thereof including used cooking oil and by-products/scraps obtained from their processing.

3. The method according to claim 2, wherein said bio-feedstock is selected from tobacco oil, palm oil, used cooking oil (UCO), crude soybean oil, CAT 1, 2 and 3 animal fats, acid oils, husk oil, and crude palm oil mill effluent.

4. The method according to claim 3, wherein said non-absorbent physical separation of said effluent comprises the following steps:
    sending said effluent to a high pressure separator to separate said effluent into at least two streams made of a gas and/or vapor phase and made of a liquid-solid phase, and
    sending said liquid-solid phase to a further physical separation step, by a centrifuge, to separate said purified bio-feedstock from said contaminants in the form of solid residues.

5. The method according to claim 1, wherein the amount of water to be used to form the emulsion is comprised between 5-50% by weight, with respect to the weight of the crude bio-feedstock to be treated.

6. The method according to claim 1, wherein said acidic water has an acid content comprised between 0.5-7% by weight, with respect to the weight of the water.

7. The method according to claim 1, wherein the pressure is comprised between 20-50 barg (2MPag-5MPag).

8. The method according to claim 1, wherein the temperature of the heat treatment is comprised between 200° C. and 300° C. . . .

9. The method according to claim 1, wherein the contact time of said emulsion in said tube or coil varies from 1 to 30 minutes.

10. The method according to claim 1, wherein said aqueous emulsion of said crude bio-feedstock is prepared by a hot mixing of said bio-feedstock with water.

11. The method according to claim 1, wherein the temperature of the heat treatment is comprised between 200° C. and 300° C., the pressure in the coil comprised between 40 and 50 barg (4-5 MPaG), and the contact time is of 1-15 minutes.

* * * * *